United States Patent
Birukov et al.

(10) Patent No.: US 12,039,548 B2
(45) Date of Patent: Jul. 16, 2024

(54) SYSTEMS AND METHODS FOR IDENTIFYING INFORMATION PROVIDERS BASED ON USER QUERIES

(71) Applicant: MasterCard International Incorporated, Purchase, NY (US)

(72) Inventors: Andrey Birukov, Scarsdale, NY (US); Arun Acharya, Tuckahoe, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 1450 days.

(21) Appl. No.: 14/973,451

(22) Filed: Dec. 17, 2015

(65) Prior Publication Data
US 2017/0178150 A1     Jun. 22, 2017

(51) Int. Cl.
*G06Q 30/0201* (2023.01)
*G06F 16/2457* (2019.01)
(Continued)

(52) U.S. Cl.
CPC ... *G06Q 30/0201* (2013.01); *G06F 16/24578* (2019.01); *G06F 16/248* (2019.01);
(Continued)

(58) Field of Classification Search
CPC .......... G06Q 30/0201; G06Q 30/0217; G06Q 30/0224; G06Q 50/14; G06F 16/24578; G06F 16/248; G06F 16/9535
(Continued)

(56) References Cited

U.S. PATENT DOCUMENTS 7,991,650 B2   8/2011   Kane, Jr.
8,249,948 B1   8/2012   Kane, Jr.
(Continued)

OTHER PUBLICATIONS

Author(s):Chu, Ka Kee Alfred . Title: Enriched archived smart card transaction data for transit demand modeling. Journal: University of Montreal [online]. Publication date: Jan. 2008.[ret. on:Apr. 23, 2022]. : < URL: https://journals.sagepub.com/doi/abs/10.3141/2063-08 > (Year: 2008).*

(Continued)

*Primary Examiner* — Tarek Elchanti
(74) *Attorney, Agent, or Firm* — Armstrong Teasdale LLP

(57) ABSTRACT

Systems and methods for identifying information providers based on user queries are provided. The method includes receiving a user query including a request for information regarding intended travel from a query capture application, processing the user query to identify query travel characteristics associated with the request for information, receiving a plurality of transaction data, and identifying a plurality of past travel transactions from the transaction data based on a set of travel indicators associated with each past travel transaction. The method further includes applying a matching algorithm to the past travel transactions and the user query to identify a list of traveler cardholders capable of responding to the user query, identifying a first traveler cardholder user device, causing the request for information to be displayed on the first traveler cardholder user device, and causing a travel response to the request for information to be displayed on a querying user device.

14 Claims, 6 Drawing Sheets

(51) Int. Cl.
*G06F 16/248* (2019.01)
*G06F 16/9535* (2019.01)
*G06Q 30/0207* (2023.01)
*G06Q 30/0217* (2023.01)
*G06Q 50/14* (2012.01)

(52) U.S. Cl.
CPC ..... *G06F 16/9535* (2019.01); *G06Q 30/0217* (2013.01); *G06Q 30/0224* (2013.01); *G06Q 50/14* (2013.01)

(58) Field of Classification Search
USPC .............................. 705/26.7, 26.1, 319, 7.34
See application file for complete search history.

(56) References Cited

U.S. PATENT DOCUMENTS

| | | | |
|---|---|---|---|
| 8,533,067 B1 | 9/2013 | Kane, Jr. | |
| 2004/0122736 A1* | 6/2004 | Strock | G06Q 30/0207 |
| | | | 705/14.31 |
| 2006/0253428 A1* | 11/2006 | Katariya | G06F 16/951 |
| 2008/0120231 A1* | 5/2008 | Megwa | G06Q 20/10 |
| | | | 705/41 |
| 2008/0154724 A1 | 6/2008 | Machlin et al. | |
| 2011/0137716 A1* | 6/2011 | Reuthe | G06Q 20/04 |
| | | | 705/14.17 |
| 2011/0264501 A1* | 10/2011 | Clyne | G06Q 20/10 |
| | | | 705/14.25 |
| 2013/0024391 A1* | 1/2013 | Vakil | G06Q 50/14 |
| | | | 705/319 |
| 2013/0054375 A1 | 2/2013 | Sy et al. | |
| 2014/0081750 A1* | 3/2014 | Hosp | G06Q 30/0241 |
| | | | 705/26.7 |
| 2014/0095216 A1 | 4/2014 | Radhakrishnan | |
| 2014/0129371 A1 | 5/2014 | Wilson et al. | |
| 2014/0143086 A1 | 5/2014 | Birsin et al. | |
| 2014/0279130 A1* | 9/2014 | Lau | G06Q 50/01 |
| | | | 705/26.1 |
| 2015/0032543 A1 | 1/2015 | Weis et al. | |
| 2015/0032565 A1 | 1/2015 | Weis et al. | |

OTHER PUBLICATIONS

Author(s): Chu, Ka Kee Alfred . Title: Passport to pleasure: credit cards and contemporary travel. Journal:International tourism research [online]. Publication date: 2005.[ret. on: Nov. 15, 2022]. : < URL: https://onlinelibrary.wiley.com/doi/pdf/10.1002/jtr.528 > (Year : 2005).*
Author(s): Vassileva. Title: Credibility of advisors Journal:USAK [online]. Publication date: 2015.[ret. on:Aug. 1, 2023]. : < URL: https://harvest.usask.ca/handle/10388/7752 > (Year: 2015).*
Vassileva Julita, How buyers perceive the credibility of advisors in online marketplace: review balance, review amount and misattribution, http://harvest.usask.ca/handle/10388/7752, 2015 (Year: 2015).*

* cited by examiner

SYSTEMS AND METHODS FOR IDENTIFYING INFORMATION PROVIDERS BASED ON USER QUERIES

BACKGROUND OF THE INVENTION

The field of the invention relates generally to query analysis and matching relevant content providers to a query and, more specifically, to soliciting queries from a first group of persons and identifying content providers that are likely to possess information responsive to the queries.

Some individuals ("querying travelers") may seek out information about intended travel before going on a vacation (or other forms of travel) to a particular location. Although querying travelers may access information such as ratings and reviews for particular accommodations or activities, detailed information specific to the querying travelers may be difficult to obtain.

Further, in some cases, identifying information that is relevant, recent, and specific may be difficult. In some examples, available information may be rarely updated. Further, some available information may not be reliable because it may be provided by individuals who post misleading or misrepresentative information. In other examples, available information may not reflect the interests of the querying travelers. As such, it may be challenging to identify responsive information for querying travelers that is recent, relevant, and reliable.

Accordingly, methods for identifying information providers to querying travelers to allow access to recent, relevant, and reliable information, are desirable.

BRIEF DESCRIPTION OF THE DISCLOSURE

In one aspect, a computer-implemented method for identifying information providers based on user queries is provided. The method is implemented using a query matching computing device in communication with one or more memory devices. The method includes receiving a user query from a query capture application operating on a querying user device, processing the user query to identify query travel characteristics associated with a request for information, receiving a plurality of transaction data associated with a plurality of cardholders from an interchange network in communication with the query matching computing device and identifying a plurality of past travel transactions from the plurality of transaction data based on a set of travel indicators associated with each past travel transaction. The query capture application receives a user query including the request for information regarding intended travel by a querying user via the querying user device. Each of the past travel transactions is associated with a traveler cardholder and includes past travel characteristics. The method further includes applying a matching algorithm to the past travel transactions and the user query to identify a list of traveler cardholders capable of responding to the user query, identifying at least a first traveler cardholder user device based on the list of traveler cardholders, causing the request for information from the user query to be displayed on the first traveler cardholder user device, and causing a travel response to the request for information from the first traveler cardholder user device to be displayed on the querying user device. The list of traveler cardholders is ranked according to a likelihood that the corresponding traveler cardholder is capable of responding to the user query.

In another aspect, a query matching computing device for identifying information providers based on user queries is provided. The query matching computing device includes one or more processors in communication with one or more memory devices. The query matching computing device receives a user query from a query capture application operating on a querying user device, processes the user query to identify query travel characteristics associated with a request for information, receives a plurality of transaction data associated with a plurality of cardholders from an interchange network in communication with the query matching computing device, and identifies a plurality of past travel transactions from the plurality of transaction data based on a set of travel indicators associated with each past travel transaction. The query capture application receives a user query including the request for information regarding intended travel by a querying user via the querying user device. Each of the past travel transactions is associated with a traveler cardholder and includes past travel characteristics. The query matching computing device further applies a matching algorithm to the past travel transactions and the user query to identify a list of traveler cardholders capable of responding to the user query, identifies at least a first traveler cardholder user device based on the list of traveler cardholders, cause the request for information from the user query to be displayed on the first traveler cardholder user device, and cause a travel response to the request for information from the first traveler cardholder user device to be displayed on the querying user device. The list of traveler cardholders is ranked according to a likelihood that the corresponding traveler cardholder is capable of responding to the user query.

In yet another aspect, a computer-readable storage medium having computer-executable instructions embodied thereon is provided. When executed by a query matching computing device having one or more processors in communication with one or more memory devices, the computer-executable instructions cause the query matching computing device to receive a user query from a query capture application operating on a querying user device, process the user query to identify query travel characteristics associated with a request for information, receive a plurality of transaction data associated with a plurality of cardholders from an interchange network in communication with the query matching computing device, and identify a plurality of past travel transactions from the plurality of transaction data based on a set of travel indicators associated with each past travel transaction. The query capture application receives a user query including the request for information regarding intended travel by a querying user via the querying user device. Each of the past travel transactions is associated with a traveler cardholder and includes past travel characteristics. The computer-executable instructions further cause the query matching computing device to apply a matching algorithm to the past travel transactions and the user query to identify a list of traveler cardholders capable of responding to the user query, identify at least a first traveler cardholder user device based on the list of traveler cardholders, cause the request for information from the user query to be displayed on the first traveler cardholder user device, and cause a travel response to the request for information from the first traveler cardholder user device to be displayed on the querying user device. The list of traveler cardholders is ranked according to a likelihood that the corresponding traveler cardholder is capable of responding to the user query.

BRIEF DESCRIPTION OF THE DRAWINGS

FIG. 1 is a schematic diagram illustrating an example multi-party payment card industry system for enabling identification of information providers that are responsive and can be matched to user queries.

FIG. 2 is a simplified block diagram of a payment processing system and a query matching computing device in communication with other computing devices in accordance with one example embodiment of the present disclosure.

FIG. 3 is an expanded block diagram of an example embodiment of server architecture of the payment processing system and the query matching computing device, and a plurality of other computing devices in accordance with one example embodiment of the present disclosure.

FIG. 4 illustrates an example configuration of a server system shown in FIGS. 2 and 3 in accordance with one example embodiment of the present disclosure.

FIG. 5 is a flowchart of an example process for identifying information providers based on user queries and matching users, performed by the query matching computing device of FIGS. 2 and 4, in accordance with one example embodiment of the present disclosure.

FIG. 6 is a diagram of components of one or more example computing devices that may be used in embodiments of the described systems and methods.

DETAILED DESCRIPTION OF THE DISCLOSURE

Figure 1:
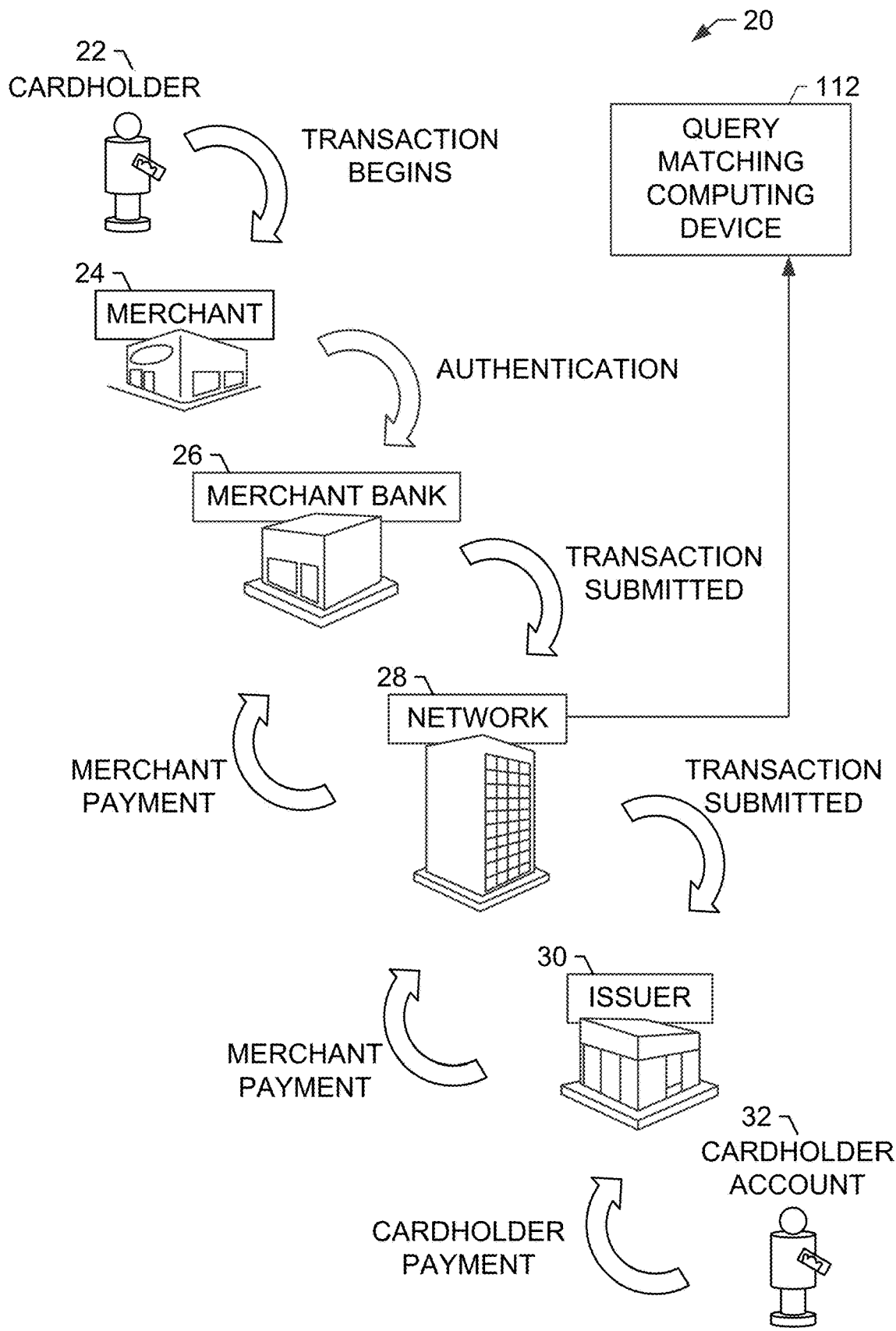
FIGS. 1-6 show example embodiments of the methods and systems described herein.

The field of the invention relates generally to query analysis and matching relevant content providers to a query and, more specifically, to soliciting queries from a first group of persons (e.g., travelers) and identifying content providers that are likely to possess information responsive to the queries. As described above, querying travelers often seek information regarding intended travel. However, identifying relevant, recent, and reliable travel information responsive to user queries may be difficult.

Accordingly, the systems and methods described herein identify information providers based on user queries and transaction data analysis. More specifically, the systems and methods described herein are configured to identify traveler cardholders that may have information responsive to the queries of querying travelers.

The methods and systems described herein may be implemented using computer programming or engineering techniques including computer software, firmware, hardware or any combination or subset thereof, to perform at least one of the following steps: (a) receiving a user query from a query capture application operating on a querying user device, wherein the query capture application is configured to receive a user query via the querying user device, and the user query includes a request for information regarding intended travel by a querying user; (b) processing the user query to identify query travel characteristics associated with the request for information; (c) receiving a plurality of transaction data associated with a plurality of cardholders from an interchange network in communication with the query matching computing device; (d) identifying a plurality of past travel transactions from the transaction data based on a set of travel indicators associated with each past travel transaction, wherein each of the past travel transactions is associated with a traveler cardholder and includes past travel characteristics; (e) applying a matching algorithm to the past travel transactions and the user query to identify a list of traveler cardholders capable of responding to the user query, wherein the list is ranked according to a likelihood that the corresponding traveler cardholder is capable of responding to the user query; (f) identifying at least a first traveler cardholder user device based on the list of traveler cardholders; (g) causing the request for information from the user query to be displayed on the first traveler cardholder user device; and (h) causing a travel response to the request for information from the first traveler cardholder user device to be displayed on the querying user device.

By performing these steps, the systems are configured to solve a problem in computer networking (and specifically in computer networking involving financial systems) of providing interaction between querying travelers and past travelers that could not otherwise be facilitated. As described herein, transaction data associated with traveler cardholders is not available to outside parties. As such, matching querying travelers with traveler cardholders (past travelers) based on the analysis of transaction data cannot be performed without the technical solution described herein.

The systems and methods described are performed by a query matching computing device. The query matching computing device is configured to provide services as described herein to devices operated by users. For example, the querying user devices operated by querying traveler users receives from the query matching computing device a query capture application. As described herein, the query capture application may provide a user forum. Using the query capture application, a querying user can specify questions about intended travel ("user queries").

The traveler cardholder user devices operated by traveler cardholders receives a query response application from the query matching computing device. As described herein, the query response application allows traveler cardholders (operating traveler cardholder user devices) to respond to user queries. The query capture application is configured to receive responses from the query response application. In at least some examples, the query capture application and the query response application are provided as a single application available to any user using a user computing device.

The query matching computing device is also in communication with an interchange network (e.g., a payment processor) through which the query matching computing device retrieves transaction data. As described below, the transaction data is analyzed to identify traveler cardholders most likely to be able to respond to a particular user query. More specifically, the query matching computing device analyzes the transaction data and finds traveler cardholders with past travel transactions that correspond to query travel characteristics associated with each user query.

As noted, the query user device receives the query capture application from the query matching computing device. The query capture application is executed on the querying user device. In the example embodiment, the query capture application provides a user forum where querying users can specify user queries (or questions about intended travel). In at least some examples, querying users may also provide profile information in addition to their user queries to provide greater context with each user query. More specifically, querying travelers may create user accounts and profile information for such user accounts before submitting user queries. As such, profile information may be associated with each user query and provided to the query matching computing device.

Profile information may include any characteristics associated with the querying traveler including, for example, lifestyle characteristics (e.g., numbers of travelers in party, accommodation preferences, transportation preferences, and dietary restrictions.) Alternately, such information may be provided within each user query.

As described, the query capture application is configured to receive a user query via the querying user device. The user query describes a request for information regarding intended travel by a querying user. Accordingly, the query matching computing device receives the user query from the query capture application.

Further, the query matching computing device processes the user query to identify query travel characteristics defining the request for information. More specifically, the query matching computing device analyzes the user query and, if available, profile information, to identify query travel characteristics. Query travel characteristics may include lifestyle characteristics and travel characteristics.

As used herein, query travel characteristics refer to the type of travel that the querying traveler is planning. Query travel characteristics may include any parameters of intended travel including, for example: (a) intended travel dates, (b) intended travel locations, (c) intended travel activities, (d) intended travel preferences, (e) characteristics of intended travelers (e.g., ages, genders, and other demographic details of travelers), (f) intended travel price levels, (g) intended travel lifestyle preferences, and (h) intended travel merchant preferences.

In a first example, the query matching computing device identifies a query travel profile associated with the user query. The query travel profile specifies a first set of logistical aspects of the query travel characteristics. For example, the query travel profile may include: (a) intended travel dates, (b) intended travel locations, (c) intended travel activities, (d) intended travel activity timing, (e) intended accommodation locations, (f) intended travel dining location, (g) intended travel dining time, and (h) number of people at each accommodation, activity, or meal.

In a second example, the query matching computing device identifies a query lifestyle profile associated with the user query. The query lifestyle profile specifies a first set of lifestyle aspects of the query travel characteristics. For example, the query lifestyle profile may include: (a) intended travel preferences, (b) characteristics of intended travelers (e.g., ages, genders, and other demographic details of travelers), (c) intended travel price levels, (d) intended travel lifestyle preferences, and (e) intended travel merchant preferences.

In at least some examples, identifying a query lifestyle profile also includes determining whether the query travel characteristics are associated with travel with children or travel without children. In some examples, the query profile or the user query may specify whether travel is intended with or without children. In other examples, identifying a query lifestyle profile also includes determining a first spend amount associated with the query travel characteristics and, more specifically, with each accommodation, activity, transportation, or meal associated with the intended travel.

The query matching computing device is also configured to receive a plurality of transaction data from the interchange network (or an interchange network computing device on the interchange network). The query matching computing device may be in communication with the interchange network or the interchange network computing device. The plurality of transaction data is associated with a plurality of cardholders.

The query matching computing device is also configured to identify a plurality of past travel transactions from the plurality of transaction data. The query matching computing device identifies the past travel transactions based on a set of travel indicators associated with each past travel transaction. As used herein, the set of travel indicators are attributes that distinguish travel transactions from non-travel transactions. For example, the set of travel indicators may include at least one of (1) the presence of multiple transactions outside of a typical transaction radius, (2) the presence of accommodation transactions such as hotel rentals, (3) the presence of long-distance transportation transactions, and (4) an absence of local transactions within the typical transaction radius during a period in which the past travel may have occurred. Further, the set of travel indicators may define a time window in which the past travel occurred. Additionally, the set of travel indicators may also define a geographic location and route associated with the past travel. Upon identifying the presence of past travel transactions (and associating such transactions together with a time window and a location), the query matching computing device may also associate each of the plurality of past travel transactions with a traveler cardholder. Further, the query matching computing device may determine that each of the plurality of past travel transactions includes past travel characteristics.

For example, the query matching computing device may analyze the past travel transactions associated with a particular past travel of a particular traveler cardholder and identify past travel characteristics. In one example, the query matching computing device identifies a past travel profile associated with each of the plurality of past travel transactions. Note that, as described above, multiple past travel transactions associated with one common past travel event for a traveler cardholder may be grouped together. The past travel profile specifies a second set of logistical aspects of the past travel characteristics. For example, the past travel profile may include: (a) past travel dates, (b) past travel locations, (c) past travel activities, (d) past travel activity timing, (e) past accommodation locations, (f) past travel dining location, (g) past travel dining time, and (h) number of people at each accommodation, activity, or meal.

In a second example, the query matching computing device identifies a past lifestyle profile associated with each of the plurality of past travel transactions. Note that, as described above, multiple past travel transactions associated with one common past travel event for a traveler cardholder may be grouped together. The past lifestyle profile specifies a second set of lifestyle aspects of the past travel characteristics. For example, the past lifestyle profile may include: (a) past travel preferences, (b) characteristics of past travelers (e.g., ages, genders, and other demographic details of travelers), (c) past travel price levels, (d) past travel lifestyle preferences, and (e) past travel merchant preferences.

In at least some examples, identifying a past lifestyle profile also includes determining whether the past travel characteristics were associated with travel with children or travel without children. For example, past travel transactions may be analyzed to determine whether purchases were made for children. In other examples, identifying a query lifestyle profile also includes determining a second spend amount associated with the past travel characteristics and, more specifically, with each accommodation, activity, transportation, or meal associated with the past travel.

The query matching computing device is also configured to identify a travel purchase behavior associated with each traveler cardholder by analyzing all travel transaction data associated with each traveler cardholder. More specifically, the query matching computing device may identify all past travel transactions (for a particular past travel event) and identify the aggregate spending amount. Further, the query matching computing device may identify whether the past travel transactions were associated with a "peak" or "off-peak" travel period. Additionally, the query matching computing device may calculate a total cost per traveler per day for the past transactions. Further, the query matching computing device is configured to identify an overall purchase behavior associated with each traveler cardholder by analyzing all transaction data (whether travel or not) associated with each traveler cardholder. Accordingly, the query matching computing device may define the past travel profile based on the overall purchase behavior and the overall travel purchase behavior. In some examples, cardholders may be grouped into tiers based on overall purchase behavior and overall travel purchase behavior.

The query matching computing device is also configured to apply a matching algorithm to the plurality of past travel transactions and the user query to identify a list of traveler cardholders able to respond to the user query. The list is ranked according to the likelihood that each traveler cardholder is able to respond to the user query. In the example embodiment, the query matching computing device identifies the user query and scores past travel transactions (or past travel transactions grouped based on a common past travel event) based upon the similarity of matching past travel profiles to query travel profiles, and past lifestyle profiles to query lifestyle profiles. In at least some examples, each element of the query travel profile and query lifestyle profile are assigned weights such that matches or partial matches by past travel transactions increases the score. As such, in some examples, the query matching computing device applies the matching algorithm to the plurality of past travel transactions and the user query by identifying similarities between the query travel profile and each past travel profile. Similarly, the query matching computing device applies the matching algorithm to the plurality of past travel transactions and the user query by identifying similarities between the query lifestyle profile and each past lifestyle profile.

The query matching computing device further identifies at least one traveler cardholder user device based on the list of traveler cardholders. Identifying at least one traveler cardholder user device represents selecting at least one traveler cardholder based on the associated ranking on the list of traveler cardholders. As described herein, the query matching computing device also provides a query response application to traveler cardholder user devices. Accordingly, the query matching computing device may identify the at least one traveler cardholder that is the highest ranked on the list of traveler cardholders and has also received the query response application. Accordingly, the selection of the at least one traveler cardholder user device may factor in both list ranking and query response application availability on the associated traveler cardholder user device.

As noted above, the at least one traveler cardholder user device receives a query response application from the query matching computing device. In at least some examples, the query response application may be previously provided to the at least one traveler cardholder user device. The query response application is configured to enable an identified traveler cardholder to respond to the user query with a travel response.

Accordingly, the identified traveler cardholder may respond to the user query with the travel response. In some examples, the identified travel cardholder receives a reward incentive from the query matching computing device via the query response application. The reward incentive may be provided to encourage the identified travel cardholder to respond to user queries. The reward incentive may include any suitable reward including reward miles, reward points, travel points, rebates, discounts, cashback, and special commercial offers. In some examples, the identified cardholder receives the reward incentive from the query matching computing device directly via the query response application. In other examples, the query matching computing device associates the reward incentive with a payment card account associated with the identified traveler cardholder such that future payments with the payment card account may automatically apply the reward incentive. In further examples, the reward incentive may only be granted to the identified traveler cardholder if the querying traveler approves of the response thereby indicating that the response was useful to the querying traveler.

The querying user device further receives the travel response from the query matching computing device. The travel response causes the query capture application to display a first set of travel information on the querying user device. In some examples, the query matching computing device may alert the querying user device to awaken and run the query capture application even if was previously in an idle or sleep mode.

The methods and systems described herein may be implemented using computer programming or engineering techniques including computer software, firmware, hardware or any combination or subset thereof, wherein the technical effects may be achieved by performing one of the following steps: (a) receiving a user query from a query capture application on the query user device, wherein the query capture application is configured to receive a user query via the querying user device, and the user query includes a request for information regarding intended travel by a querying user; (b) processing the user query to identify query travel characteristics associated with the request for information; (c) receiving a plurality of transaction data from an interchange network in communication with the query matching computing device, wherein the plurality of transaction data is associated with a plurality of cardholders; (d) identifying a plurality of past travel transactions from the plurality of transaction data based on a set of travel indicators associated with each past travel transaction, wherein each of the plurality of past travel transactions is associated with a traveler cardholder, wherein each of the plurality of past travel transactions includes past travel characteristics; (e) applying a matching algorithm to the plurality of the past travel transactions and the user query to identify a list of traveler cardholders capable of responding to the user query, wherein the list is ranked according to a likelihood that the corresponding traveler cardholder is capable of responding to the user query; (f) identifying at least a first traveler cardholder user device based on the list of traveler cardholders; (g) causing the request for information from the user query to be displayed on the first traveler cardholder user device; (h) causing a travel response to the request for information from the first traveler cardholder user device to be displayed on the querying user device (i) identifying a query travel profile associated with the user query, wherein the query travel profile specifies a first set of logistical aspects of the query travel characteristics, identifying a past travel profile associated with the plurality of past travel transactions, wherein the past travel profile specifies a second set of logistical aspects of each of the past travel transactions, and applying the matching algorithm to the plurality of past travel transactions and the user query by identifying similarities between the query travel profile and each past travel profile; (j) identifying an overall purchase behavior associated with each traveler cardholder by analyzing all transaction data associated with each traveler cardholder and defining each past travel profile based on the overall purchase behavior; (k) identifying a query lifestyle profile associated with the user query, wherein the query lifestyle profile specifies a first set of lifestyle aspects of the query travel characteristics, identifying a past lifestyle profile associated with the plurality of past travel transactions, wherein the past lifestyle profile specifies a second set of lifestyle aspects of each of the past travel transactions, and applying the matching algorithm to the plurality of past travel transactions and the user query by identifying similarities between the query lifestyle profile and each past lifestyle profile; (l) identifying the query lifestyle profile by determining whether the query travel characteristics are associated with traveling with children or traveling without children and identifying the past lifestyle profile by determining whether the past travel profiles are associated with traveling with children or traveling without children; (m) identifying the query lifestyle profile by determining a first spend amount associated with the query travel characteristics and identifying the past lifestyle profile by determining a second spend amount associated with the past travel profiles; and transmitting a reward incentive to a query response application after the first traveler cardholder responds to the user query with the travel response, wherein the first traveler cardholder device includes a query response application that is configured to prompt the first traveler cardholder via the first traveler cardholder device to respond to the user query with the travel response.

Described herein are computer systems such as a query matching computing device, querying user device, a traveler cardholder user device, a payment network computing device, issuer computing devices, and related systems. As described herein, all such computer systems include a processor and a memory. However, the query matching computing device is specifically configured to carry out the steps described herein.

Further, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California.)

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

The systems and processes are not limited to the specific embodiments described herein. In addition, components of each system and each process can be practiced independent and separate from other components and processes described herein. Each component and process also can be used in combination with other assembly packages and processes.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a gift card, and/or any other device that may hold payment account information, such as mobile phones, smartphones, personal digital assistants (PDAs), key fobs, and/or computers. Each type of transaction card can be used as a method of payment for performing a transaction.

The following detailed description illustrates embodiments of the disclosure by way of example and not by way of limitation. It is contemplated that the disclosure has general application to identifying information providers based on user queries, and matching information providers to querying travelers.

FIG. 1 is a schematic diagram illustrating an example multi-party payment card system 20 for enabling identification of information providers that are responsive and can be matched to user queries. The present disclosure relates to payment card system 20, such as a credit card payment system using the MasterCard® payment card system payment network 28 (also referred to as an "interchange" or "interchange network"). MasterCard® payment card system payment network 28 is a proprietary communications standard promulgated by MasterCard International Incorporated® for the exchange of financial transaction data between financial institutions that are members of MasterCard International Incorporated®. (MasterCard is a registered trademark of MasterCard International Incorporated located in Purchase, New York).

In payment card system 20, a financial institution such as an issuer 30 issues a payment card for an account, such as a credit card account or a debit card account, to a cardholder 22, who uses the payment card to tender payment for a purchase from a merchant 24. To accept payment with the payment card, merchant 24 must normally establish an account with a financial institution that is part of the financial payment system. This financial institution is usually called the "merchant bank" or the "acquiring bank" or "acquirer bank" or simply "acquirer". When a cardholder 22 tenders payment for a purchase with a payment card (also known as a financial transaction card), merchant 24 requests authorization from acquirer 26 for the amount of the purchase. Such a request is referred to herein as an authorization request message. The request may be performed over the telephone, but is usually performed through the use of a point-of-interaction terminal, also referred to herein as a point-of-sale device, which reads the cardholder's account information from the magnetic stripe on the payment card and communicates electronically with the transaction processing computers of acquirer 26. Alternatively, acquirer 26 may authorize a third party to perform transaction processing on its behalf. In this case, the point-of-interaction terminal will be configured to communicate with the third party. Such a third party is usually called a "merchant processor" or an "acquiring processor."

Using payment card system payment network 28, the computers of acquirer 26 or the merchant processor will communicate with the computers of issuer 30, to determine whether the cardholder's account 32 is in good standing and whether the purchase is covered by the cardholder's available credit line or account balance. Based on these determinations, the request for authorization will be declined or accepted. If the request is accepted, an authorization code is issued to merchant 24.

When a request for authorization is accepted, the available credit line or available balance of cardholder's account 32 is decreased. Normally, a charge is not posted immediately to a cardholder's account because bankcard associations, such as MasterCard International Incorporated®, have promulgated rules that do not allow a merchant to charge, or "capture," a transaction until goods are shipped or services are delivered. When a merchant ships or delivers the goods or services, merchant 24 captures the transaction by, for example, appropriate data entry procedures on the point-of-interaction terminal. If a cardholder cancels a transaction before it is captured, a "void" is generated. If a cardholder returns goods after the transaction has been captured, a "credit" is generated.

For debit card transactions, when a request for authorization is approved by the issuer, the cardholder's account 32 is decreased. Normally, a charge is posted immediately to cardholder's account 32. The bankcard association then transmits the approval to the acquiring processor for distribution of goods/services, or information or cash in the case of an ATM.

After a transaction is captured, the transaction is settled between merchant 24, acquirer 26, and issuer 30. Settlement refers to the transfer of financial data or funds between the merchant's account, acquirer 26, and issuer 30 related to the transaction. Usually, transactions are captured and accumulated into a "batch," which is settled as a group.

As described herein, query matching computing device 112 is in communication with payment network 28 and accordingly may receive transaction data associated with each transaction processed on payment network 28 in the manners described herein. Accordingly, query matching computing device 112 is configured to receive, and process transactions data.

Figure 2:
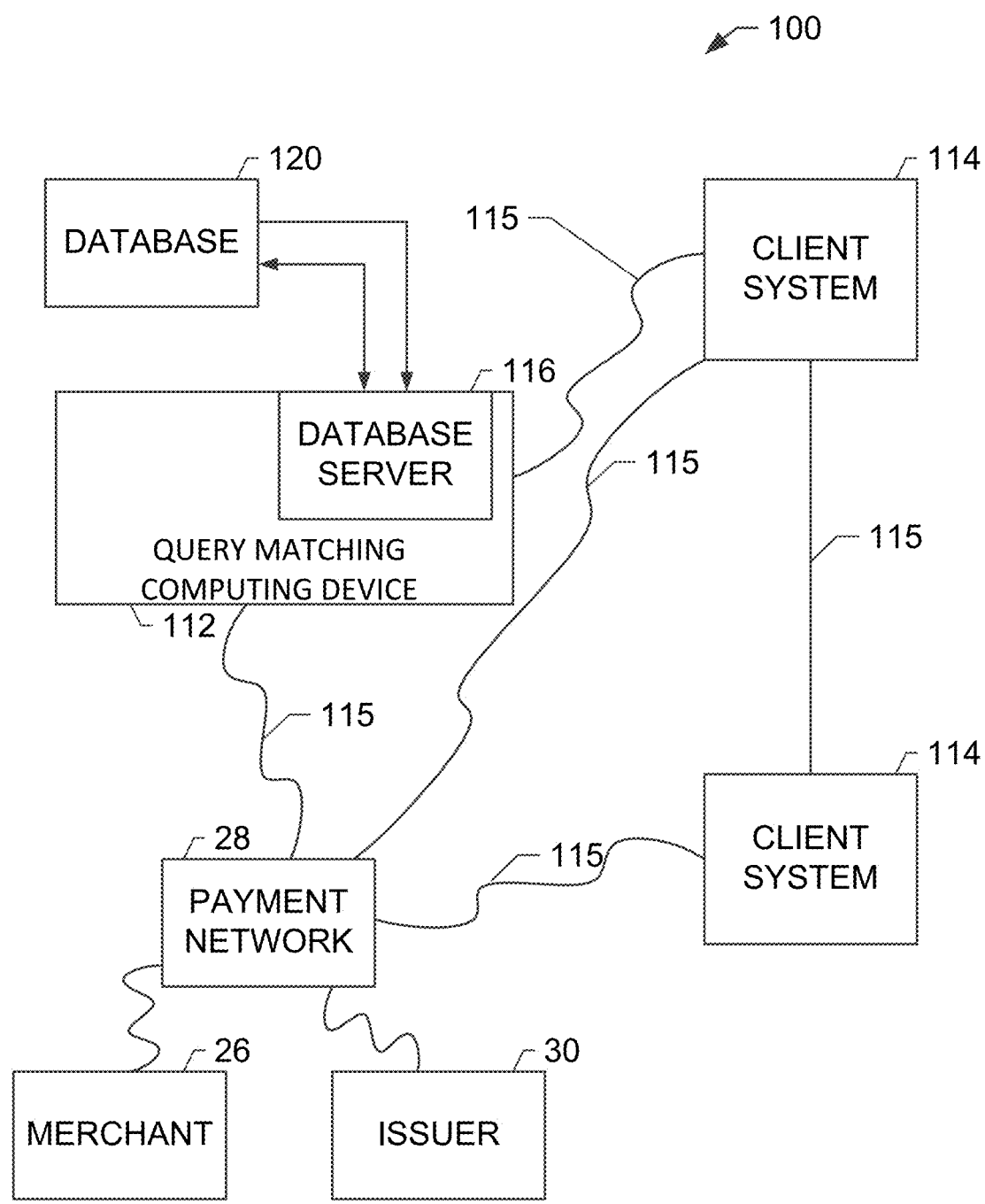

FIG. 2 is a simplified block diagram of an example computer system 100 used to identify information providers based on user queries and match information providers with querying travelers, in accordance with the present disclosure. In the example embodiment, system 100 is used for receiving the user query from a query capture application operating on the querying user device, wherein the query capture application is configured to receive a user query including a request for information regarding intended travel by a querying user via the querying user device, processing the user query to identify query travel characteristics associated with the request for information, receiving a plurality of transaction data associated with a plurality of cardholders from an interchange network in communication with the query matching computing device, identifying a plurality of past travel transactions from the plurality of transaction data based on a set of travel indicators associated with each past travel transaction, wherein each of the plurality of past travel transactions is associated with a traveler cardholder, wherein each of the plurality of past travel transactions includes past travel characteristics, applying a matching algorithm to the plurality of the past travel transactions and the user query to identify a list of traveler cardholders capable of responding to the user query, wherein the list is ranked according to a likelihood that the corresponding traveler cardholder is capable of responding to the user query, identifying at least a first traveler cardholder user device based on the list of traveler cardholders, causing the request for information from the user query to be displayed on the first traveler cardholder user device, and causing a travel response to the request for information from the first traveler cardholder user device to be displayed on the querying user device, as described herein. In other embodiments, the applications may reside on other computing devices (not shown) communicatively coupled to system 100, and may perform similar functions of identifying information providers based on user queries and matching information providers with querying travelers, using system 100.

More specifically, in the example embodiment, system 100 includes a query matching computing device 112, and a plurality of client sub-systems, also referred to as client systems 114, connected to query matching computing device 112. In one embodiment, client systems 114 are computers including a web browser, such that query matching computing device 112 is accessible to client systems 114 using the Internet. Client systems 114 are interconnected to the Internet through many interfaces including a network 115, such as a local area network (LAN) or a wide area network (WAN), dial-in-connections, cable modems, special high-speed Integrated Services Digital Network (ISDN) lines, and RDT networks. Client systems 114 may include systems associated with cardholders 22 (shown in FIG. 1) or issuer banks. Query matching computing device 112 is also in communication with payment network 28 using network 115. Further, client systems 114 may additionally communicate with payment network 28 using network 115. Client systems 114 could be any device capable of interconnecting to the Internet including a web-based phone, PDA, or other web-based connectable equipment.

A database server 116 is connected to database 120, which contains information on a variety of matters, as described below in greater detail. In one embodiment, centralized database 120 is stored on query matching computing device 112 and can be accessed by potential users at one of client systems 114 by logging onto query matching computing device 112 through one of client systems 114. In an alternative embodiment, database 120 is stored remotely from query matching computing device 112 and may be non-centralized. Databases 116 and 120 may be configured to store transaction data, travel profile structures, lifestyle profile structures, and reward management definitions.

Database 120 may include a single database having separated sections or partitions, or may include multiple databases, each being separate from each other. Database 120 may store transaction data generated over the processing network including data relating to merchants, account holders, prospective customers, issuers, acquirers, and/or purchases made. Database 120 may also store account data including at least one of a cardholder name, a cardholder address, an account number, other account identifiers, and transaction information. Database 120 may also store merchant information including a merchant identifier that identifies each merchant registered to use the network, and instructions for settling transactions including merchant bank account information. Database 120 may also store purchase data associated with items being purchased by a cardholder from a merchant, and authorization request data.

In the example embodiment, one of client systems 114 may be associated with acquirer bank 26 (shown in FIG. 1) while another one of client systems 114 may be associated with issuer bank 30 (shown in FIG. 1). Query matching computing device 112 may be associated with interchange network 28. In the example embodiment, query matching computing device 112 is associated with a network interchange, such as interchange network 28, and may be referred to as an interchange computer system or to alternatively receive data from the interchange computer system. Query matching computing device 112 may be used for processing transaction data. In addition, client systems 114 may include a computer system associated with at least one of an online bank, a bill payment outsourcer, an acquirer bank, an acquirer processor, an issuer bank associated with a transaction card, an issuer processor, a remote payment system, customers and/or billers. Further, client systems 114 may include querying user devices and traveler cardholder user devices. Accordingly, query matching computing device 112 may be directly in communication with querying user devices and traveler cardholder user devices.

Figure 3:
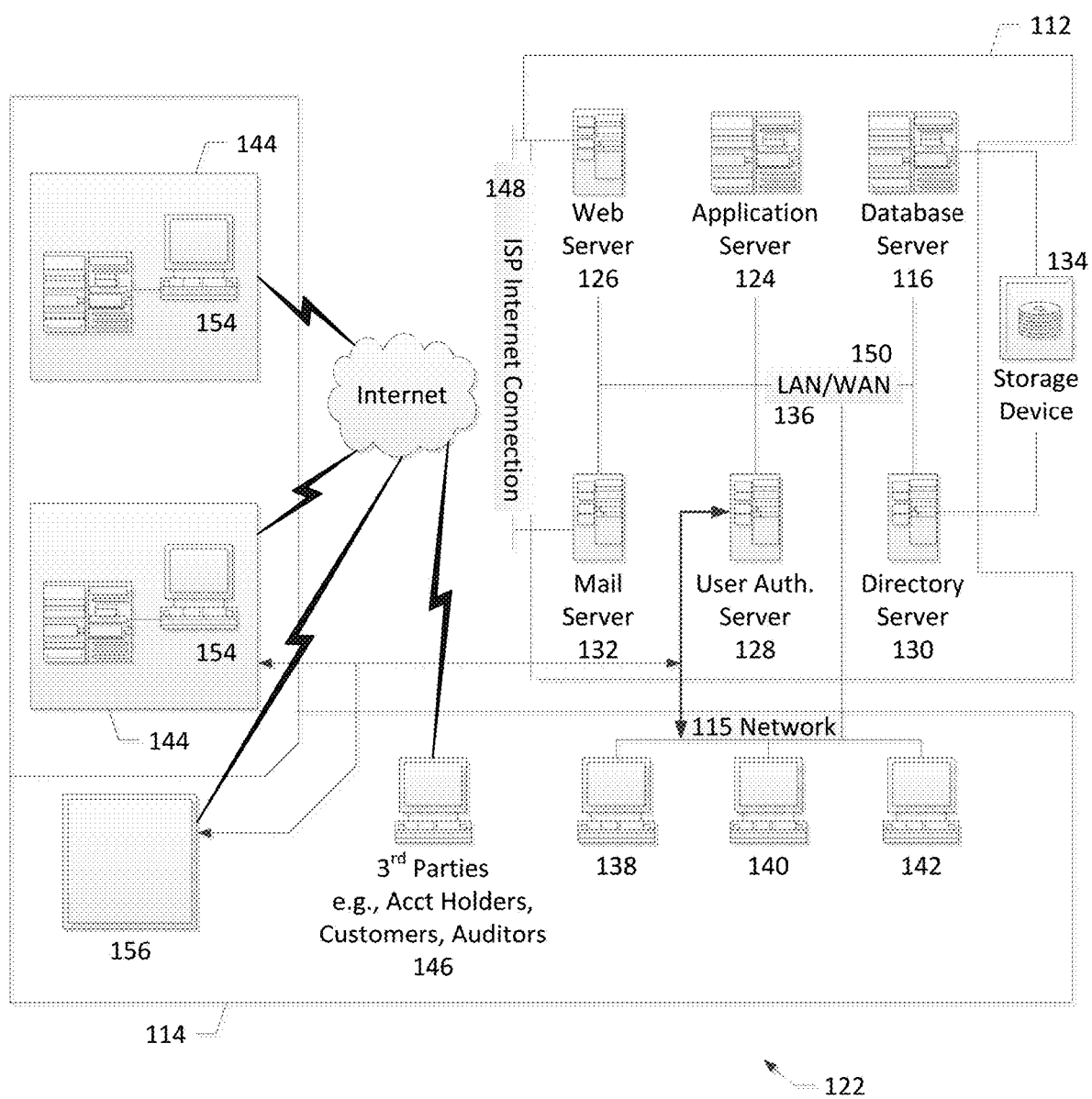

FIG. 3 is an expanded block diagram of an example embodiment of a computer server system architecture of a processing system 122 used to identify information providers based on user queries in accordance with one embodiment of the present disclosure. Components in system 122, identical to components of system 100 (shown in FIG. 2), are identified in FIG. 3 using the same reference numerals as used in FIG. 2. System 122 includes query matching computing device 112, client systems 114, and payment systems 118. Query matching computing device 112 further includes database server 116, a transaction server 124, a web server 126, a user authentication server 128, a directory server 130, and a mail server 132. A storage device 134 is coupled to database server 116 and directory server 130. Servers 116, 124, 126, 128, 130, and 132 are coupled in a local area network (LAN) 136. In addition, an issuer bank workstation 138, an acquirer bank workstation 140, and a third party processor workstation 142 may be coupled to LAN 136. In the example embodiment, issuer bank workstation 138, acquirer bank workstation 140, and third party processor workstation 142 are coupled to LAN 136 using network connection 115. Workstations 138, 140, and 142 are coupled to LAN 136 using an Internet link or are connected through an Intranet.

Each workstation 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Query matching computing device 112 is configured to be operated by various individuals including employees 144 and to third parties, e.g., account holders, customers, auditors, developers, consumers, merchants, acquirers, issuers, etc., 146 using an ISP Internet connection 148. The communication in the example embodiment is illustrated as being performed using the Internet, however, any other wide area network (WAN) type communication can be utilized in other embodiments, i.e., the systems and processes are not limited to being practiced using the Internet. In addition, and rather than WAN 150, local area network 136 could be used in place of WAN 150. Query matching computing device 112 is also configured to be communicatively coupled to payment systems 118. Payment systems 118 include computer systems associated with merchant bank 26, interchange network 28, issuer bank 30 (all shown in FIG. 1), and interchange network 28. Additionally, payments systems 118 may include computer systems associated with acquirer banks and processing banks. Accordingly, payment systems 118 are configured to communicate with query matching computing device 112 and provide transaction data as discussed below.

In the example embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with query matching computing device 112.

Also, in the example embodiment, web server 126, application server 124, database server 116, and/or directory server 130 may host web applications, and may run on multiple server systems 112. The term "suite of applications," as used herein, refers generally to these various web applications running on server systems 112.

Furthermore, user authentication server 128 is configured, in the example embodiment, to provide user authentication services for the suite of applications hosted by web server 126, application server 124, database server 116, and/or directory server 130. User authentication server 128 may communicate with remotely located client systems, including a client system 156. User authentication server 128 may be configured to communicate with other client systems 138, 140, and 142 as well.

Figure 4:
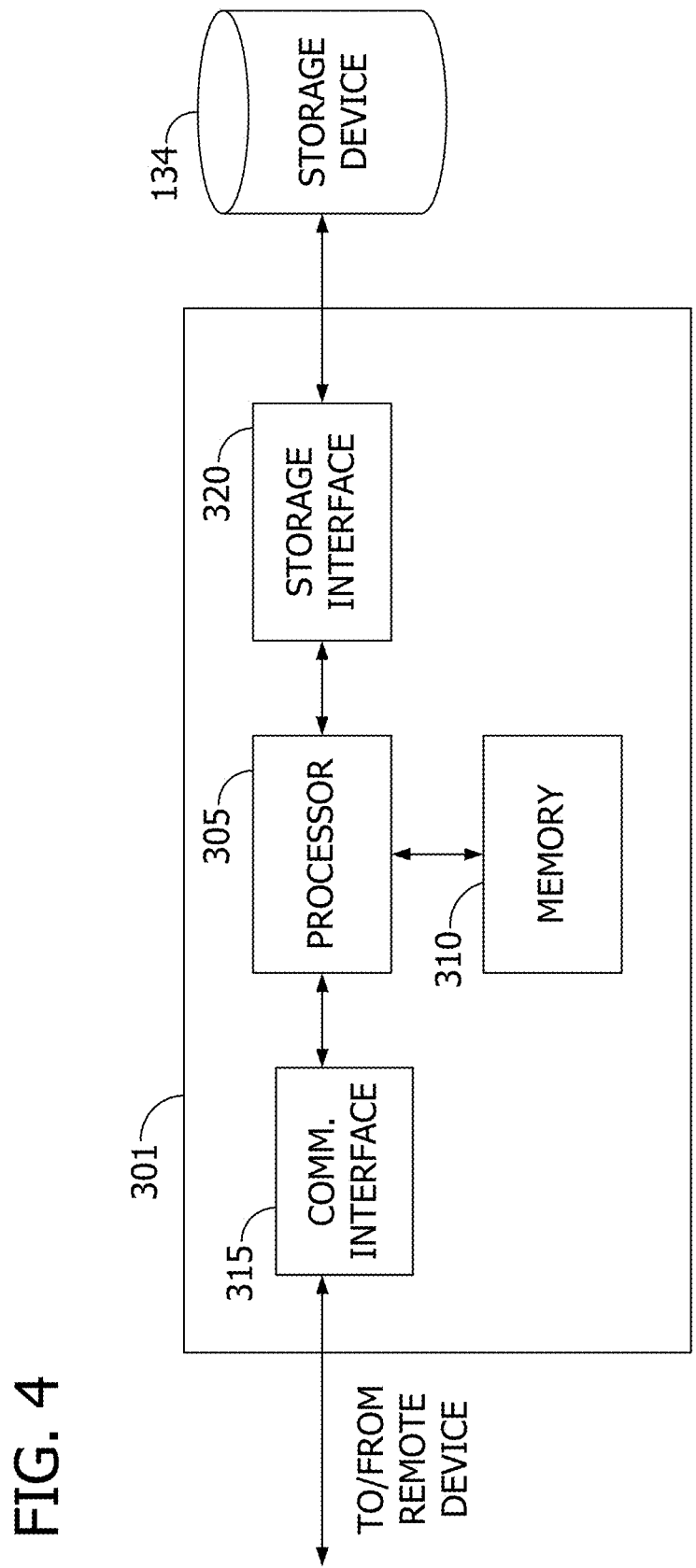

FIG. 4 illustrates an example configuration of a server system 301 such as query matching computing device 112 (shown in FIGS. 2 and 3). Server system 301 may include, but is not limited to, database server 116, transaction server 124, web server 126, user authentication server 128, directory server 130, and mail server 132. In the example embodiment, server system 301 determines and analyzes characteristics of devices used in payment transactions, as described below.

Server system 301 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the server system 301, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 305 is operatively coupled to a communication interface 315 such that server system 301 is capable of communicating with a remote device such as a user system or another server system 301. For example, communication interface 315 may receive requests from user system 114 via the Internet, as illustrated in FIGS. 2 and 3.

Processor 305 may also be operatively coupled to a storage device 134. Storage device 134 is any computer-operated hardware suitable for storing and/or retrieving data. In some embodiments, storage device 134 is integrated in server system 301. For example, server system 301 may include one or more hard disk drives as storage device 134. In other embodiments, storage device 134 is external to server system 301 and may be accessed by a plurality of server systems 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory area 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 5:
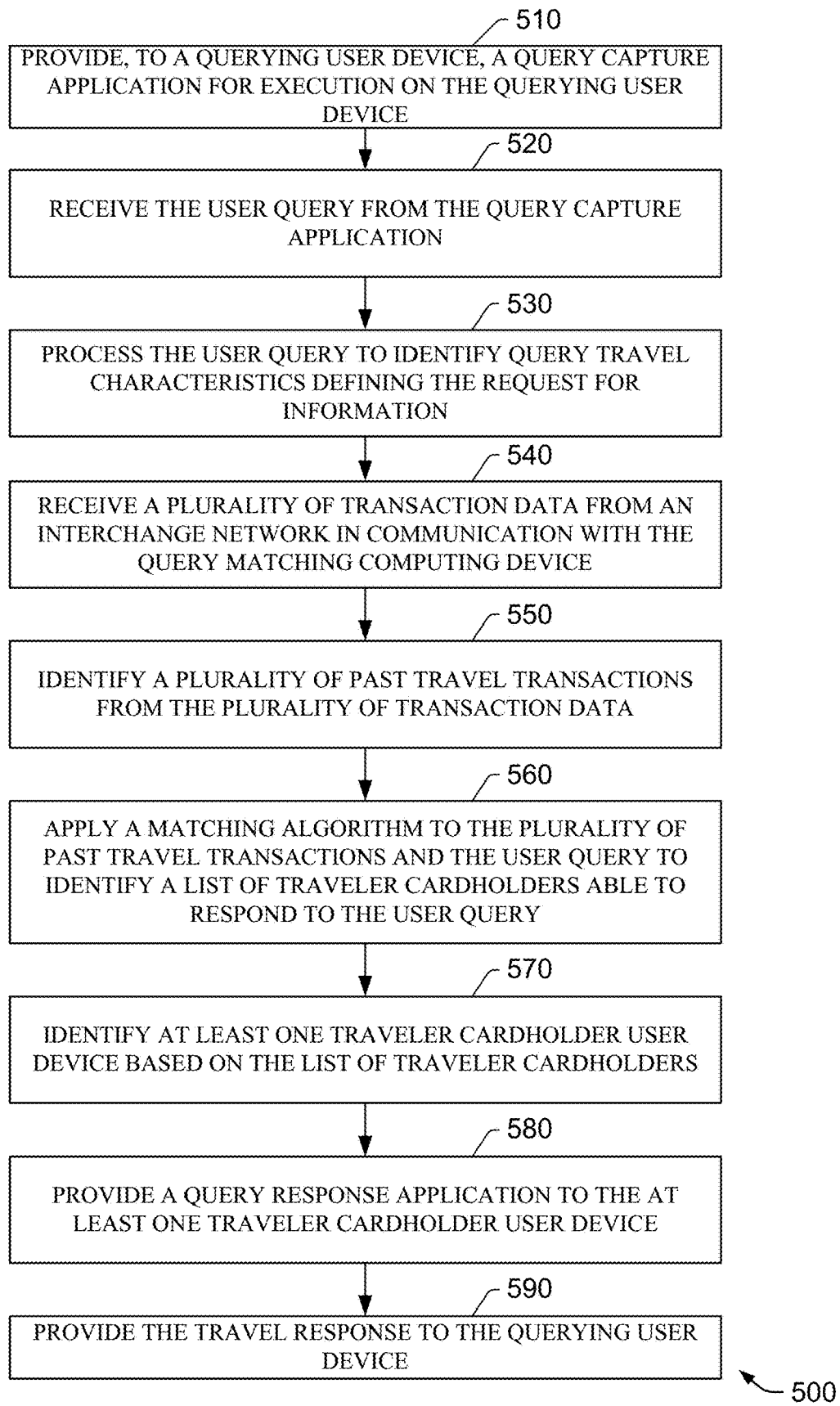

FIG. 5 is a flowchart of an example process for identifying information providers based on user queries and matching information providers with querying travelers, performed by query matching computing device 112 of FIGS. 2 and 4, in accordance with one example embodiment of the present disclosure. More specifically, query matching computing device 112 provides 510 the query capture application to a querying user device 114. The query capture application is executed on querying user device 114. In the example embodiment, the query capture application provides a user forum where querying users can specify user queries (or questions about intended travel). In at least some examples, querying users may also provide profile information in addition to their user queries to provide greater context with each user query. More specifically, querying travelers may create user accounts and profile information for such user accounts before submitting user queries. As such, profile information may be associated with each user query and provided to the query matching computing device 112. Profile information may include any characteristics associated with the querying traveler including, for example, lifestyle characteristics (e.g., numbers of travelers in party, accommodation preferences, transportation preferences, and dietary restrictions.) Alternately, such information may be provided within each user query.

As described, the query capture application is configured to receive a user query via the querying user device 114. The user query includes a request for information regarding intended travel by a querying user. Accordingly, the query matching computing device 112 receives 520 the user query from the query capture application.

Further, the query matching computing device 112 processes 530 the user query to identify query travel characteristics associated with the request for information. More specifically, the query matching computing device 112 analyzes the user query and, if available, profile information, to identify query travel characteristics. As used herein, query travel characteristics refer to the type of travel that the querying traveler is planning. Query travel characteristics may include any parameters of intended travel including, for example: (a) intended travel dates, (b) intended travel locations, (c) intended travel activities, (d) intended travel preferences, (e) characteristics of intended travelers (e.g., ages, genders, and other demographic details of travelers), (f) intended travel price levels, (g) intended travel lifestyle preferences, and (h) intended travel merchant preferences.

In a first example, the query matching computing device 112 identifies a query travel profile associated with the user query. The query travel profile specifies a first set of logistical aspects of the query travel characteristics. For example, the query travel profile may include: (a) intended travel dates, (b) intended travel locations, (c) intended travel activities, (d) intended travel activity timing, (e) intended accommodation locations, (f) intended travel dining location, (g) intended travel dining time, and (h) number of people at each accommodation, activity, or meal.

In a second example, the query matching computing device 112 identifies a query lifestyle profile associated with the user query. The query lifestyle profile specifies a first set of lifestyle aspects of the query travel characteristics. For example, the query lifestyle profile may include: (a) intended travel preferences, (b) characteristics of intended travelers (e.g., ages, genders, and other demographic details of travelers), (c) intended travel price levels, (d) intended travel lifestyle preferences, and (e) intended travel merchant preferences.

In at least some examples, identifying a query lifestyle profile also includes determining whether the query travel characteristics are associated with travel with children or travel without children. In some examples, the query profile or the user query may specify whether travel is intended with or without children. In other examples, identifying a query lifestyle profile also includes determining a first spend amount associated with the query travel characteristics and, more specifically, with each accommodation, activity, transportation, or meal associated with the intended travel.

The query matching computing device 112 is also configured to receive 540 a plurality of transaction data from the interchange network 28 (or an interchange network computing device on the interchange network). The query matching computing device 112 may be in communication with the interchange network 28 or the interchange network computing device. The plurality of transaction data is associated with a plurality of cardholders.

The query matching computing device 112 is also configured to identify 550 a plurality of past travel transactions from the plurality of transaction data. The query matching computing device 112 identifies 550 the past travel transactions based on a set of travel indicators associated with each past travel transaction. As used herein, the set of travel indicators are attributes that distinguish travel transactions from non-travel transactions. For example, the set of travel indicators may include at least one of (1) the presence of multiple transactions outside of a typical transaction radius, (2) the presence of accommodation transactions such as hotel rentals, (3) the presence of long-distance transportation transactions, and (4) an absence of local transactions within the typical transaction radius during a period in which the past travel may have occurred. Further, the set of travel indicators may define a time window in which the past travel occurred. Additionally, the set of travel indicators may also define a geographic location and route associated with the past travel. Upon identifying the presence of past travel transactions (and associating such transactions together with a time window and a location), the query matching computing device 112 may also associate each of the plurality of past travel transactions with a traveler cardholder. Further, the query matching computing device 112 may determine that each of the plurality of past travel transactions includes past travel characteristics such as dates, locations, activities, and other characteristic of past travel.

For example, the query matching computing device 112 may analyze the past travel transactions associated with a particular past travel of a particular traveler cardholder and identify past travel characteristics. In one example, the query matching computing device 112 identifies a past travel profile associated with each of the plurality of past travel transactions. Note that, as described above, multiple past travel transactions associated with one common past travel event for a traveler cardholder may be grouped together. The past travel profile specifies a second set of logistical aspects of the past travel characteristics. For example, the past travel profile may include: (a) past travel dates, (b) past travel locations, (c) past travel activities, (d) past travel activity timing, (e) past accommodation locations, (f) past travel dining location, (g) past travel dining time, and (h) number of people at each accommodation, activity, or meal.

In a second example, the query matching computing device 112 identifies a past lifestyle profile associated with each of the plurality of past travel transactions. Note that, as described above, multiple past travel transactions associated with one common past travel event for a traveler cardholder may be grouped together. The past lifestyle profile specifies a second set of lifestyle aspects of the past travel characteristics. For example, the past lifestyle profile may include: (a) past travel preferences, (b) characteristics of past travelers (e.g., ages, genders, and other demographic details of travelers), (c) past travel price levels, (d) past travel lifestyle preferences, and (e) past travel merchant preferences.

In at least some examples, identifying a past lifestyle profile also includes determining whether the past travel characteristics were associated with travel with children or travel without children. For example, past travel transactions may be analyzed to determine whether purchases were made for children. In other examples, identifying a query lifestyle profile also includes determining a second spend amount associated with the past travel characteristics and, more specifically, with each accommodation, activity, transportation, or meal associated with the past travel.

The query matching computing device 112 is also configured to identify a travel purchase behavior associated with each traveler cardholder by analyzing all travel transaction data associated with each traveler cardholder. More specifically, the query matching computing device 112 may identify all past travel transactions (for a particular past travel event) and identify the aggregate spending amount. Further, the query matching computing device 112 may identify whether the past travel transactions were associated with a "peak" or "off-peak" travel period. Additionally, the query matching computing device may calculate a total cost per traveler per day for the past transactions. Further, the query matching computing device 112 is configured to identify an overall purchase behavior associated with each traveler cardholder by analyzing all transaction data (whether travel or not) associated with each traveler cardholder. Accordingly, the query matching computing device 112 may define the past travel profile based on the overall purchase behavior and the overall travel purchase behavior. In some examples, cardholders may be grouped into tiers based on overall purchase behavior and overall travel purchase behavior.

The query matching computing device 112 is also configured to apply 560 a matching algorithm to the plurality of past travel transactions and the user query to identify a list of traveler cardholders capable of responding to the user query. The list is ranked according to the likelihood that each traveler cardholder is able to respond to the user query. In the example embodiment, the query matching computing device 112 identifies the user query and scores past travel transactions (or past travel transactions grouped based on a common past travel event) based upon the similarity of matching past travel profiles to query travel profiles and past lifestyle profiles to query lifestyle profiles. In at least some examples, each element of the query travel profile and query lifestyle profile are assigned weights such that matches or partial matches by past travel transactions increases the score. As such, in some examples, the query matching computing device 112 applies 560 the matching algorithm to the plurality of past travel transactions and the user query by identifying similarities between the query travel profile and each past travel profile. Similarly, the query matching computing device 112 applies 560 the matching algorithm to the plurality of past travel transactions and the user query by identifying similarities between the query lifestyle profile and each past lifestyle profile.

The query matching computing device 112 further identifies 570 at least one traveler cardholder user device based on the list of traveler cardholders. Identifying 570 at least one traveler cardholder user device represents selecting at least one traveler cardholder based on the associated ranking on the list of traveler cardholders. As described herein, the query matching computing device 112 also provides 580 a query response application to traveler cardholder user devices 114. Accordingly, the query matching computing device 112 may identify the at least one traveler cardholder that is the highest ranked on the list of traveler cardholders and has also received the query response application. Accordingly, the selection of the at least one traveler cardholder user device may factor in both list ranking and query response application availability on the associated traveler cardholder user device 114.

The query matching computing device 112 also provides 580 a query response application to the at least one traveler cardholder user device as noted above. In at least some examples, the query response application may be previously provided to the at least one traveler cardholder user device 114 shown in FIG. 2. The query response application is configured to allow a identified traveler cardholder to respond to the user query with a travel response.

Accordingly, the identified traveler cardholder may respond to the user query with the travel response. In some examples, the query matching computing device 112 provides a reward incentive to the identified travel cardholder via the query response application. The reward incentive may be provided to encourage the identified travel cardholder to respond to user queries. The reward incentive may include any suitable reward including reward miles, reward points, travel points, rebates, discounts, cashback, and special commercial offers. In some examples, the query matching computing device 112 provides the reward incentive directly via the query response application. In other examples, the query matching computing device 112 associates the reward incentive with a payment card account associated with the identified traveler cardholder such that future payments with the payment card account may automatically apply the reward incentive. In further examples, the reward incentive may only be granted to the identified traveler cardholder if the querying traveler approves of the response thereby indicating that the response was useful to the querying traveler.

The query matching computing device 112 is also configured to provide 590 the travel response to the querying user device 114. The query matching computing device 112 causes the query capture application to display the travel response and a first set of travel information on the querying user device. In some examples, the query matching computing device 112 may alert the querying user device to awaken and run the query capture application even if was previously in an idle or sleep mode.

Figure 6:
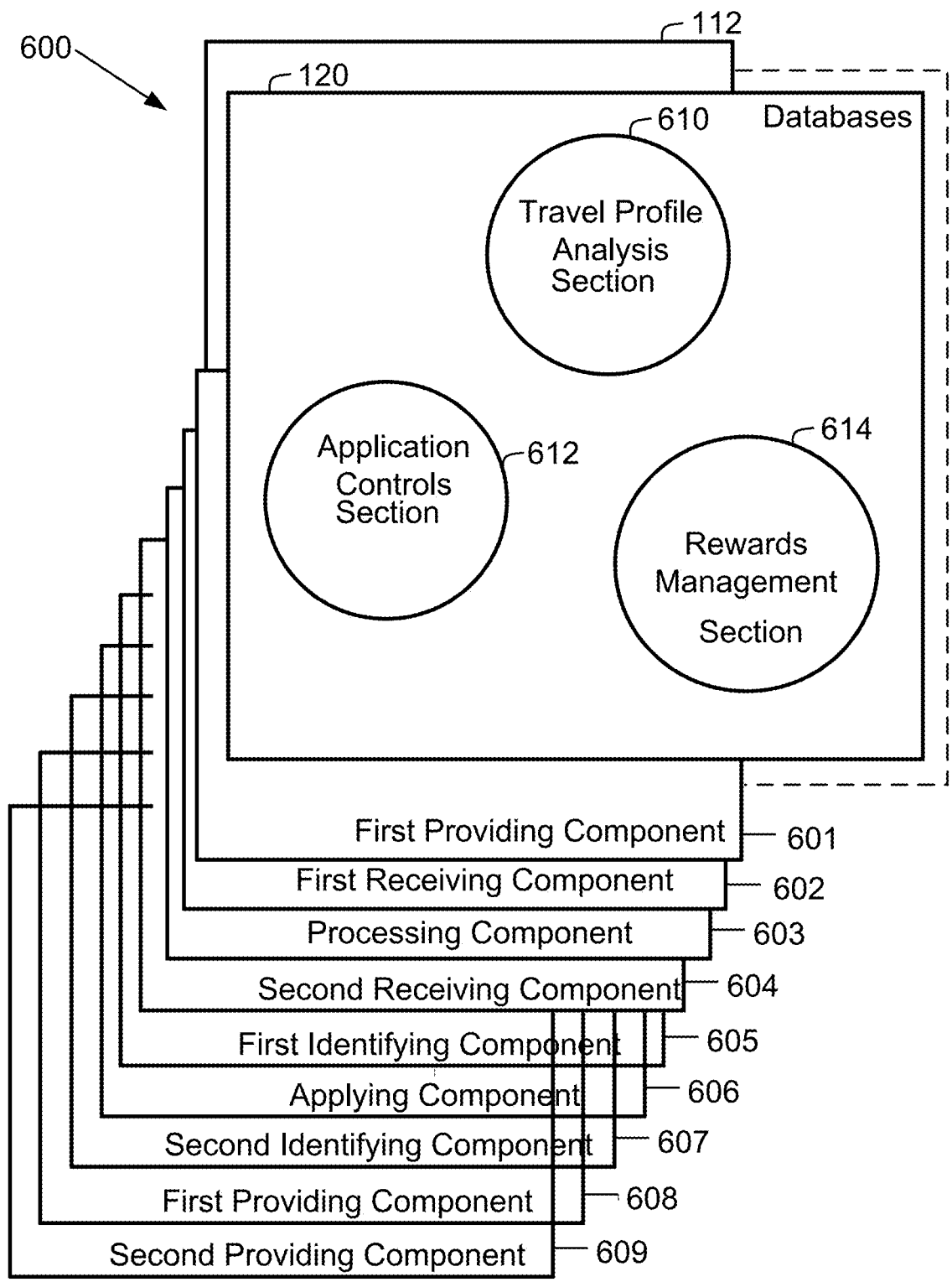

FIG. 6 is a diagram 600 of components of one or more example computing devices that may be used in the method shown in FIG. 5. FIG. 6 further shows a configuration of databases including at least database 120 (shown in FIG. 1). Database 120 is coupled to several separate components within query matching computing device 112, which perform specific tasks.

Query matching computing device 112 includes a first providing component 601 for receiving the user query from a query capture application on the query user device, wherein the query capture application is configured to receive a user query via the querying user device, and the user query includes a request for information regarding intended travel by a querying user. Query matching computing device 112 includes a first receiving component 602 for receiving the user query from the query capture application. Query matching computing device 112 includes a processing component 603 for processing the user query to identify query travel characteristics defining the request for information. Query matching computing device 112 also includes a second receiving component 604 for receiving a plurality of transaction data from an interchange network in communication with the query matching computing device, wherein the plurality of transaction data is associated with a plurality of cardholders. Query matching computing device 112 additionally includes a first identifying component 605 for identifying a plurality of past travel transactions from the plurality of transaction data based on a set of travel indicators associated with each past travel transaction, wherein each of the plurality of past travel transactions is associated with a traveler cardholder, wherein each of the plurality of past travel transactions includes past travel characteristics. Query matching computing device 112 further includes an applying component 606 for applying a matching algorithm to the plurality of past travel transactions and the user query to identify a list of traveler cardholders able to respond to the user query, wherein the list is ranked according to the likelihood that each traveler cardholder is able to respond to the user query. Query matching computing device 112 also includes a second identifying component 607 for identifying at least one traveler cardholder user device based on the list of traveler cardholders. Query matching computing device 112 further includes a first providing component 608 for providing a query response application to the at least one traveler cardholder user device, wherein the query response application is configured to allow an identified traveler cardholder to respond to the user query with a travel response. Query matching computing device 112 additionally includes a second providing component 609 for providing the travel response to the querying user device, wherein the travel response causes the query capture application to display a first set of travel information on the querying user device.

In an exemplary embodiment, database 120 is divided into a plurality of sections, including but not limited to, a travel profile analysis section 610, an application controls section 612, and a rewards management section 614. These sections within database 120 are interconnected to update and retrieve the information as required.

As will be appreciated based on the foregoing specification, the above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal"

refers to any signal used to provide machine instructions and/or data to a programmable processor.

This written description uses examples, including the best mode, to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A computer-implemented method for identifying information providers based on user queries, said method implemented using a query matching computing device in communication with one or more memory devices, said method comprising:
   receiving, by the query matching computing device, a user query from a query capture application operating on a querying user device, wherein the query capture application is configured to receive a user query via the querying user device of a querying user, and the user query includes a request for information regarding intended travel by the querying user, the information requested by the querying user from one or more cardholders identifiable by the query matching computer device as having experience relevant to the intended travel;
   processing, by the query matching computing device, the user query to identify j) a query travel profile associated with the request for information and ii) a query lifestyle profile associated with the request for information, wherein the query travel profile specifies at least one of a) intended travel dates, b) intended travel locations, c) intended accommodation locations, and d) intended travel dining, and wherein the query lifestyle profile specifies at least one of a) characteristics of intended travelers, and b) intended travel price levels;
   receiving a plurality of transaction data from an interchange network in communication with the query matching computing device, wherein the plurality of transaction data is associated with a plurality of traveler cardholders;
   identifying a plurality of past travel transactions from the plurality of transaction data based on a set of travel indicators associated with each past travel transaction, wherein each of the plurality of past travel transactions is associated with a corresponding one of the plurality of traveler cardholders;
   identifying, for each of the plurality of past travel transactions, i) a past travel profile and ii) a past lifestyle profile, wherein the past travel profile specifies at least one of a) past travel dates, b) past travel locations, c) past accommodation locations, and d) past travel dining, and wherein the past lifestyle profile specifies at least one of a) characteristics of past travelers, and b) past travel price levels;
   applying, by the query matching computing device, a matching algorithm to the plurality of the past travel transactions and the user query to generate, for each of the plurality of past travel transactions, a score for the past travel transaction based on i) a similarity between the query travel profile and the past travel profile for that past travel transaction and ii) a similarity between the query lifestyle profile and the past lifestyle profile for that past travel transaction;
   identifying, based on the generated scores, a list of the traveler cardholders as the one or more cardholders capable of responding to the user query, wherein the list is ranked according to a likelihood that the corresponding traveler cardholder is capable of responding to the user query;
   identifying, from the list of traveler cardholders capable of responding to the user query, a first traveler cardholder most likely to be capable of responding to the user query, wherein the first traveler cardholder is associated with a first traveler cardholder user device, and wherein the first traveler cardholder is different from the querying user;
   causing the request for information from the user query to be displayed on the first traveler cardholder user device to prompt the first traveler cardholder for a response;
   receiving, from the first traveler cardholder user device, a travel response to the request for information of the querying user, wherein the travel response includes travel information in response to the user query, and wherein the travel response is input to the first traveler cardholder user device by the first traveler cardholder; and
   causing, by the query matching computing device, the travel response to the request for information from the first traveler cardholder user device and the travel information to be displayed on the querying user device.

2. The method of claim 1, further comprising:
   identifying an overall purchase behavior associated with each traveler cardholder by analyzing all transaction data associated with each traveler cardholder; and
   defining each past travel profile based on the overall purchase behavior.

3. The method of claim 1:
   wherein the query lifestyle profile indicates whether the intended travelers include or do not include children; and
   wherein each past lifestyle profile indicates whether the past travelers included or did not include children.

4. The method of claim 1, further comprising:
   identifying the query lifestyle profile by determining a first spend amount associated with the user query; and
   identifying each past lifestyle profile by determining a second spend amount associated with the associated past travel profile.

5. The method of claim 1, wherein the first traveler cardholder device includes a query response application that is configured to prompt the first traveler cardholder via the first traveler cardholder device to respond to the user query with the travel response, and wherein the method further comprises transmitting a reward incentive to the query response application after the first traveler cardholder responds to the user query with the travel response.

6. A query matching computing device for identifying information providers based on user queries, said query matching computing device comprising one or more processors in communication with one or more memory devices, said query matching computing device configured to:
   receive a user query from a query capture application operating on a querying user device, wherein the query capture application is configured to receive a user query via the querying user device of a querying user, and the user query includes a request for information regarding intended travel by the querying user, the information requested by the querying user from one or more cardholders identifiable by the query matching computer device as having experience relevant to the intended travel;

process the user query to identify i) a query travel profile associated with the request for information and ii) a query lifestyle profile associated with the request for information, wherein the query travel profile specifies at least one of a) intended travel dates, b) intended travel locations, c) intended accommodation locations, and d) intended travel dining, and wherein the query lifestyle profile specifies at least one of a) characteristics of intended travelers, and b) intended travel price levels;

receive a plurality of transaction data from an interchange network in communication with the query matching computing device, wherein the plurality of transaction data is associated with a plurality of traveler cardholders;

identify a plurality of past travel transactions from the plurality of transaction data based on a set of travel indicators associated with each past travel transaction, wherein each of the plurality of past travel transactions is associated with a corresponding one of the plurality of traveler cardholders;

identify, for each of the plurality of past travel transactions, i) a past travel profile and ii) a past lifestyle profile, wherein the past travel profile specifies at least one of a) past travel dates, b) past travel locations, c) past accommodation locations, and d) past travel dining, and wherein the past lifestyle profile specifies at least one of a) characteristics of past travelers, and b) past travel price levels;

apply a matching algorithm to the plurality of the past travel transactions and the user query to generate, for each of the plurality of past travel transactions, a score for the past travel transaction based on i) a similarity between the query travel profile and the past travel profile for that past travel transaction and ii) a similarity between the query lifestyle profile and the past lifestyle profile for that past travel transaction;

identify, based on the generated scores, a list of the traveler cardholders as the one or more cardholders capable of responding to the user query, wherein the list is ranked according to a likelihood that the corresponding traveler cardholder is capable of responding to the user query;

identify, from the list of traveler cardholders capable of responding to the user query, a first traveler cardholder most likely to be capable of responding to the user query, wherein the first traveler cardholder is associated with a first traveler cardholder user device, and wherein the first traveler cardholder is different from the querying user;

cause the request for information from the user query to be displayed on the first traveler cardholder user device to prompt the first traveler cardholder for a response;

receive, from the first traveler cardholder user device, a travel response to the request for information of the querying user, wherein the travel response includes travel information in response to the user query, and wherein the travel response is input to the first traveler cardholder user device by the first traveler cardholder; and cause the travel response to the request for information from the first traveler cardholder user device and the travel information to be displayed on the querying user device.

7. The query matching computing device of claim 6, said query matching computing device further configured to:
identify an overall purchase behavior associated with each traveler cardholder by analyzing the transaction data associated with each traveler cardholder; and
define each past travel profile based on the overall purchase behavior.

8. The query matching computing device of claim 6:
wherein the query lifestyle profile indicates whether the intended travelers include or do not include children; and
wherein each past lifestyle profile indicates whether the past travelers included or did not include children.

9. The query matching computing device of claim 6, said query matching computing device further configured to:
identify the query lifestyle profile by determining a first spend amount associated with the user query; and
identify each past lifestyle profile by determining a second spend amount associated with the associated past travel profile.

10. The query matching computing device of claim 6, wherein the first traveler cardholder device includes a query response application that is configured to prompt the first traveler cardholder via the first traveler cardholder device to respond to the user query with the travel response, and wherein the query matching computing device is further configured to transmit a reward incentive to the query response application after the first traveler cardholder responds to the user query with the travel response.

11. A computer-readable storage medium having computer-executable instructions embodied thereon, wherein when executed by a query matching computing device having one or more processors in communication with one or more memory devices, the computer-executable instructions cause the query matching computing device to:

receive a user query from a query capture application operating on a querying user device, wherein the query capture application is configured to receive a user query via the querying user device of a querying user, and the user query includes a request for information regarding intended travel by the querying user, the information requested by the querying user from one or more cardholders identifiable by the query matching computer device as having experience relevant to the intended travel;

process the user query to identify i) a query travel profile associated with the request for information and ii) a query lifestyle profile associated with the request for information, wherein the query travel profile specifies at least one of a) intended travel dates, b) intended travel locations, c) intended accommodation locations, and d) intended travel dining, and wherein the query lifestyle profile specifies at least one of a) characteristics of intended travelers, and b) intended travel price levels;

receive a plurality of transaction data from an interchange network in communication with the query matching computing device, wherein the plurality of transaction data is associated with a plurality of traveler cardholders;

identify a plurality of past travel transactions from the plurality of transaction data based on a set of travel indicators associated with each past travel transaction, wherein each of the plurality of past travel transactions is associated with a corresponding one of the plurality of traveler cardholders;

identify, for each of the plurality of past travel transactions, i) a past travel profile and ii) a past lifestyle profile, wherein the past travel profile specifies at least one of a) past travel dates, b) past travel locations, c) past accommodation locations, and d) past travel dining, and wherein the past lifestyle profile specifies at least one of a) characteristics of past travelers, and b) past travel price levels;

apply a matching algorithm to the plurality of the past travel transactions and the user query to generate, for each of the plurality of past travel transactions, a score for the past travel transaction based on i) a similarity between the query travel profile and the past travel profile for that past travel transaction and ii) a similarity between the query lifestyle profile and the past lifestyle profile for that past travel transaction;

identify, based on the generated scores, a list of the traveler cardholders as the one or more cardholders capable of responding to the user query, wherein the list is ranked according to a likelihood that the corresponding traveler cardholder is capable of responding to the user query;

identify, from the list of traveler cardholders capable of responding to the user query, a first traveler cardholder most likely to be capable of responding to the user query, wherein the first traveler cardholder is associated with a first traveler cardholder user device, and wherein the first traveler cardholder is different from the querying user;

cause the request for information from the user query to be displayed on the first traveler cardholder user device to prompt the first traveler cardholder for a response;

receive, from the first traveler cardholder user device, a travel response to the request for information of the querying user, wherein the travel response includes travel information in response to the user query, and wherein the travel response is input to the first traveler cardholder user device by the first traveler cardholder; and cause the travel response to the request for information from the first traveler cardholder user device and the travel information to be displayed on the querying user device.

12. The computer-readable storage medium of claim 11, wherein the computer-executable instructions further cause the query matching computing device to:

identify an overall purchase behavior associated with each traveler cardholder by analyzing all transaction data associated with each traveler cardholder; and define each past travel profile based on the overall purchase behavior.

13. The computer-readable storage medium of claim 11:

wherein the query lifestyle profile indicates whether the intended travelers include or do not include by determining whether the query travel characteristics are associated with traveling with children or traveling without children; and identify the wherein each past lifestyle profile indicates whether the past travelers included or did not include children.

14. The computer-readable storage medium of claim 11, wherein the first traveler cardholder device includes a query response application that is configured to prompt the first traveler cardholder via the first traveler cardholder device to respond to the user query with the travel response, and wherein the computer-executable instructions further cause the query matching computing device to transmit a reward incentive to the query response application after the first traveler cardholder responds to the user query with the travel response.

* * * * *